Feb. 1, 1966 C. S. STONE 3,233,177

RADIO FREQUENCY RECEIVER GAIN CONTROL SYSTEM
WITH CONSTANT INPUT IMPEDANCE

Filed Sept. 17, 1962

CHARLES S. STONE
INVENTOR.

BY Arnold and Roylance 3,233,177
Patented Feb. 1, 1966

3,233,177

RADIO FREQUENCY RECEIVER GAIN CONTROL SYSTEM WITH CONSTANT INPUT IMPEDANCE

Charles S. Stone, Austin, Tex., assignor to Tracor, Inc., Austin, Tex., a corporation of Texas Filed Sept. 17, 1962, Ser. No. 224,192
5 Claims. (Cl. 325—400)

The present invention relates to radio receivers and, more particularly to a radio frequency input stage having an automatic gain control with constant impedance.

In the design of receivers, such as very low frequency (VLF) tracking receivers, the fact of extreme variations in radio frequency signal amplitude received by the antenna must be taken into account. The VLF region abounds in atmospheric noise.

The need has been for a way to maintain the signal level in the receiver, even with severe receiver level signal variations. The gain control circuits of the prior art have not been completely satisfactory in signals with wide level variations and, in many cases, were located and constructed in such a manner that significant phase shift occurred.

The advantages of maintaining the signal level in a VLF tracking receiver by placing a gain control circuit in the radio frequency stages could not be utilized, because even a small phase shift introduced by a gain control cannot be tolerated (the VLF tracking receiver receives a standard transmitted signal and maintains a reference oscillator in exact phase relation with the standard signal, for frequency standards and time control systems).

Another important consideration for a gain control circuit is to maintain a constant impedance in the gain control circuit, for optimum operation of the associated circuits.

It is therefore an object of the present invention to provide an improved automatic radio frequency gain control system.

Another object of the present invention is to provide an improved radio frequency gain control having a very small phase shift, less than $\mp 0.25$ microseconds phase shift over a 40 db. input signal range.

A further object of the present invention is to provide an improved radio frequency gain control having constant input impedance over a wide range of input signals.

A still further object of the present invention is to furnish a relatively inexpensive and reliable radio frequency gain control circuit.

Other objects and advantages of the present invention will be apparent from a reading of the description and drawings.

In brief, one embodiment of the present invention can be described as comprising means for receiving a radio frequency signal and applying the radio frequency signal across input terminals. A network means is connected across the input terminals and has output terminals. The network maintains a substantially constant input resistance across said terminals. A D.C. control signal responsive to the amplitude of the radio-frequency signal is coupled to the network means to maintain a substantially constant amplitude radio-frequency signal at the output terminals.

The network means in one embodiment comprises a first resistor having a resistance of the approximate value of the desired resistance across the input terminals. A variable resistor is in series with the first resistor across the input terminals and the resistance of the variable resistor is varied in response to the D.C. control signal mentioned above. An amplifier has its input coupled to the junction between the first resistor and the adjustable resistor and its output connected across the network output terminals. Means is provided to couple the output of the amplifier to the series first and adjustable resistors to change the effective input resistance in response to the amplifier output.

Figure 1:
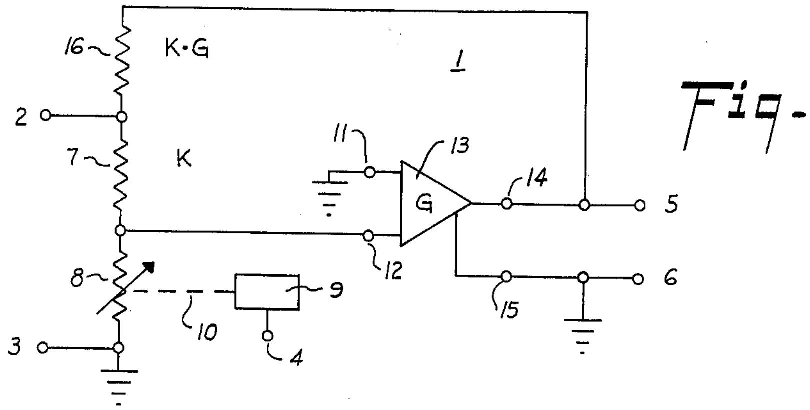
FIG. 1 is a simplified diagram for one embodiment of a gain control circuit in accordance with the present invention.

A simplified embodiment of a radio-frequency gain control network 1, constructed in accordance with the present invention, is illustrated in FIG. 1 for introduction. The input signal, typically taken from antenna transmission line or a radio-frequency amplifier, is applied across terminals 2 and 3, the latter being connected to the ground. A D.C. control signal proportional to the amplitude of the input signal amplitude is applied to a control input terminal 4. This D.C. control signal is derived by any amplitude indicating circuit (not shown), such as found in conventional receivers AVC circuits, or by the indicating circuit described in United States Patent application Serial Number 224,063, filed Sept. 17, 1962, by Charles S. Stone, entitled Indicating Circuit. The gain control network 1 functions, in response to the D.C. control current, to maintain the radio-frequency signal amplitude at gain control network output terminals 5 and 6 substantially constant with an increased input amplitude and presents a substantially constant, zero phase shift impedance at the input terminals 2 and 3.

The gain control network includes a fixed resistor 7, having a resistance equal to K—approximately equal to the desired input resistance to match with the next preceding circuit, and a variable resistor 8, such as a potentiometer. The resistance of variable resistor 8 is varied in response to the D.C. control signal at control input terminal 4 through a suitable control arrangement, such as a servo motor 9 mechanically coupled to the control arm of a potentiometer for variable resistor 8, as indicated by the dotted line 10. The variable resistor 8 is coupled across the input terminals 11 and 12 of an amplifier 13 having a gain equal to G and output leads 14 and 15 coupled across the gain control network output terminals 5 and 6. The amplifier 13 is so arranged that a 180 degree phase shift occurs between input terminals 11 and 12 and output terminals 14 and 15 for an input signal.

The output of amplifier 13 is coupled to the series resistor 7 and adjustable resistor 8 by a resistor 16 connected between amplifier output terminal 14 and the end of resistor 7 connected to gain control network input terminal 2, the resistor 16 having a resistance of K times the gain G of amplifier 13. In effect, the combination of amplifier 13 and resistor 16 furnishes a degenerative feedback to the input of gain control network 1.

In operation, gain control network 1 is essentially a current divider network and, with a radio frequency low input signal level at input terminals 2 and 3 the input to amplifier 13 and a corresponding small D.C. control current at control input terminal 4, the variable resistor 8 is arranged to be essentially an open circuit and full gain is realized from the amplifier 13. If, however, the radio frequency input signal is high and the D.C. control current correspondingly high, the servo motor 9 decreases the resistance of variable resistor 8 essentially to zero and most of the radio frequency input current passes through variable resistor 8 to ground, and the net gain of amplifier 13 in combination with signal loss to ground through resistor 8, is relatively small.

A stable resistance is provided at terminals 5 and 6, the input termination resistance for the subsequent stage following the gain control circuit 1. When variable resistor 8 is essentially at its largest resistance, degeneration feedback through resistor 16 lowers the effective input termination resistance to approximate K. It does this by supplying a maximum signal to terminal 2 from amplifier 13 as explained above across resistor 16 180 degrees out of phase and approximately equal to the signal across resistor 8. Since terminals 5 and 6 are across the complete combination of resistors 16, 7 and 8, the effective resistance appears to be only that of resistor 7. Similarly when variable resistor 8 is essentially short circuited, the input resistance is chiefly supplied by resistor 7. This is because the value of resistor 8 is very small and the signal output of amplifier 13 is very small so that there is maintained the canceling action as explained above between the signals across resistors 8 and 16. At intervening values of radio-frequency input signal level and corresponding intervening values of D.C. control current, the degenerative action continues to provide an input resistance quite near K.

The gain control circuit 1 has very small phase shift as the radio-frequency signal is controlled, since only resistors are used.

Figure 2:
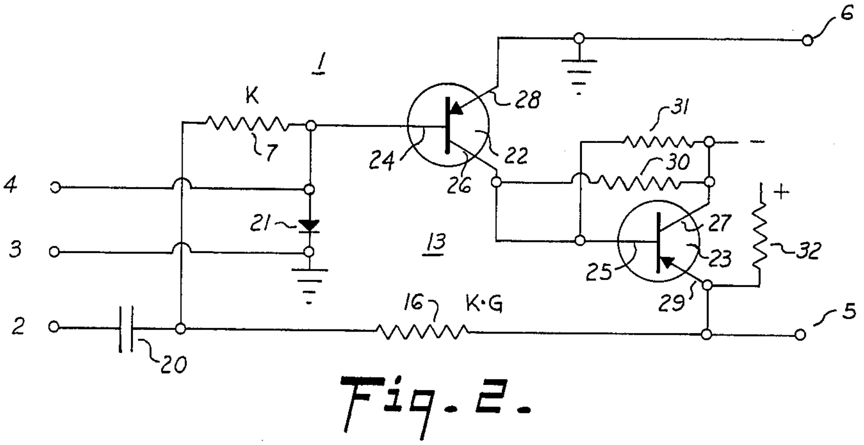
FIG. 2 is a schematic drawing of another embodiment of a gain control circuit in accordance with the present invention.

A particularly advantageous embodiment of the present invention is illustrated in FIG. 2, where the elements that are the same as in the gain control circuit of FIG. 1 have the same reference numbers. The radio-frequency input signal is coupled through a capacitor 20 from gain control network input terminal 2 across resistor 7. The variable resistor in series with resistor 7 between ground is a semi-conductor diode 21, such as a fast recovery computer diode, having an A.C. conductance which is roughly proportional to a D.C. bias current supplied to it. Thus, the control input terminal 4 is connected directly to the junction between the anode of diode 21 and resistor 7 to supply the D.C. control current that varies the resistance of diode 21 in the manner as above described for variable resistor 8 in the operation of gain control circuit 1. The diode 21 is essentially an open circuit at small D.C. control currents and essentially a short-circuit at the high D.C. control currents for a high radio-frequency signal level.

In the gain control network 1 of FIG. 2 the amplifier 13 is transistorized, using PNP transistors 22 and 23, each having a base 24 and 25, respectively, collector 26 and 27, respectively, and emitter, 28 and 29 respectively. The input to amplifier 13 is between base 24 and grounded emitter 28 of transistor 22 across diode 21. The collector 26 of transistor 22 is directly coupled to base 25 of transistor 23, and the collector 26 and base 25 are suitably biased through separate resistors 30 and 31, respectively, from the negative terminal of a D.C. source (not shown). The emitter 29 of transistor 23 is suitably biased through a resistor 32 to positive terminal of D.C. source (not shown). The output terminals 5 and 6 of gain control network 1 are connected to the emitter 29 of transistor 23 and to ground respectively. The degenerative feedback is provided by resistor 16 coupled between the emitter 29 of transistor 23 and the junction of resistor 7 and capacitor 20, the phase relation between the input at base 24 of transistor 22 and emitter 29 of transistor 23 being 180 degrees.

Figure 3:
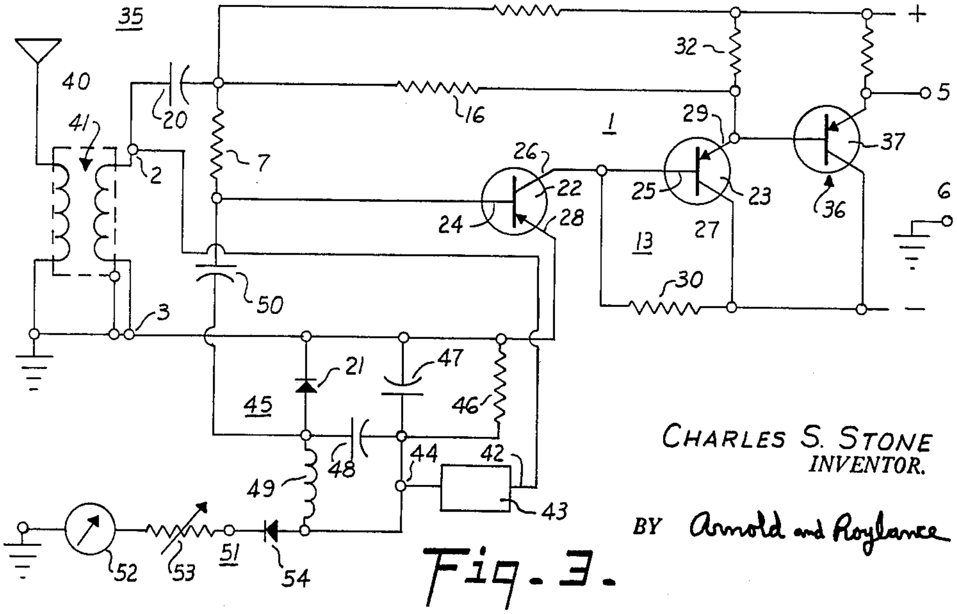
FIG. 3 is a more detailed schematic drawing of the embodiment of a gain control circuit of FIG. 2 showing the arrangement of a signal level indicating circuit in accordance with the present invention.

A radio frequency gain control system 35, such as for a VLF tracking receiver, is shown in FIG. 3, with a gain control network 1 essentially the same as in FIG. 2, except for the addition of one transistor stage 36 having a transistor 37 in amplifier 13, and like reference numbers used. The input radio-frequency signal is obtained from an antenna 40, coupled through a radio-frequency transformer 41 to the gain control network input terminals 2 and 3. The radio-frequency transformer 41 is also coupled to the input 42 of an amplitude level indicating circuit 43 that produces a D.C. control current at an output 44 proportional to the radio-frequency signal level, as described above. The indicating circuit output 44 is coupled through a filter network 45 to diode 21.

The filter network 45 includes a resistor 46 that shunts the input from the indicating circuit 43, making a voltage source input to filter network 45. D.C. isolation of the indicating circuit is provided by a capacitor 47 that shunts resistor 46, a capacitor 48 connected between the ungrounded end of diode 21 and resistor 46, and a choke 49 in parallel with capacitor 48. The ungrounded end of diode 21 (the anode) is coupled to the base 24 of transistor 22 by a capacitor 50 to provide D.C. isolation for diode 21 from transistor 22 while providing a short circuit to the radio-frequency signal.

The radio-frequency signal level is indicated by connection of a meter circuit 51 to the gain control network 1 of FIG. 3. The meter circuit 51 includes a D.C. current meter 52, adjustable resistor 53 and a diode 54, all in series, connected between ground and the end of choke 49 opposite the connection to diode 21. Diodes 54 and 21 are poled with their anodes back to back. Diode 54 is the same type as diode 21, matching it as closely as possible. The D.C. meter indicates the radio-frequency signal level on a linear scale, instead of a compressed, logarithmic scale, as would be the case if diode 54 were omitted.

It is apparent that from the teaching herein, other embodiments of the present invention can be designed and changes in the disclosed embodiment can be made. These embodiments and all such changes are to be considered as a part of the present invention as defined in the appended claims.

I claim:

1. A constant input resistance and constant amplitude amplifying circuit comprising
- an amplifier having an input terminal and an output terminal;
- two signal input terminals;
- a first resistor and a variable resistor connected in series circuit relationship between said signal input terminals, the junction of said first resistor and said variable resistor being coupled to said amplifier input terminal;
- means for varying the resistance of said variable resistor in response to a control signal; and
- degenerative feedback circuit means interconnecting said amplifier output terminal and the one of said two signal input terminals connected to said first resistor for maintaining the effective resistance between said two terminals substantially equal to the value of said first resistor.

2. Apparatus, as described in claim 1, wherein,
- said amplifier comprises first and second transistors each having a base, emitter and collector, the base of said first transistor being coupled to the junction of said first and adjustable resistors,
- the collector of said first transistor being coupled to the base of said second transistor,
- the emitter of said first transistor being coupled to the input terminal connected to said adjustable resistor,
- means biasing said first and second transistors for amplifier operation; and
- said degenerative feedback circuit means is a resistor coupled between the emitter of said second transistor and said input terminal connected to said first resistor to provide the degenerative feedback.

3. Apparatus, as described in claim 1, wherein,
- said variable resistor is a first diode having a conductance substantially proportional to the current flow therethrough;

a control input terminal is connected to the junction of said first resistor and said first diode to receive a D.C. control current;

a second diode matching said first diode is connected to said control input terminal; and a D.C. meter is connected between the other end of said second diode and the input terminal connected to said first diode, to provide a linear indication of the D.C. control current.

4. Apparatus, as described in claim 1, wherein said variable resistor is a diode having a conductance substantially proportional to the current flow therethrough;

a control input terminal is connected to the junction of said first resistor and said first diode to receive a D.C. control current; and a D.C. meter is connected between the other end of said diode and the input terminal connected to the junction of said first resistor and said first diode, to provide a logarithmic indication of the D.C. control current.

5. A constant input resistance and constant amplitude amplifying circuit comprising an amplifier having an input terminal and an output terminal;

an output terminal;

two signal input terminals;

a first resistor and a variable resistor connected in series circuit relationship between said signal input terminals, the junction of said first resistor and said variable resistor being coupled to said amplifier input terminal;

means for varying the resistance of said variable resistor in response to a control signal; and a feedback resistance interconnecting a point in said amplifier at which the signal is 180° out of phase from the signal at said signal input terminals to the one of said two input terminals connected to said first resistor.

References Cited by the Examiner

UNITED STATES PATENTS

| | | | |
|---|---|---|---|
| 2,895,045 | 7/1959 | Kagan | 325—319 |
| 3,027,518 | 3/1962 | Ketchledge | 330—29 |
| 3,082,381 | 3/1963 | Morrill et al. | 330—86 |
| 2,115,601 | 12/1963 | Harris | 323—66 |
| 3,117,287 | 1/1964 | Damico | 330—86 |
| 3,153,152 | 10/1964 | Hoffman | 330—26 |

OTHER REFERENCES

Cruft Laboratory Staff, Electronics Circuits and Tubes, N.Y. McGraw-Hill Book Co., Inc., TK7815.H3 (page 728).

DAVID G. REDINBAUGH, *Primary Examiner.*

E. C. MULCAHY, Jr., B. V. SAFOUREK, *Assistant Examiners.*